United States Patent Office 3,769,297
Patented Oct. 30, 1973

3,769,297
CARBAZOLE CATIONIC DYESTUFFS
Alfred Brack, Leverkusen, and Walter Gomm, Cologne, Germany, assignors to Bayer Aktiengesellschaft, Leverkusen, Germany
No Drawing. Filed Mar. 1, 1971, Ser. No. 119,968
Claims priority, application Germany, Mar. 6, 1970, P 20 10 578.6
Int. Cl. C07d 27/72
U.S. Cl. 260—315    16 Claims

ABSTRACT OF THE DISCLOSURE

Cationic dyestuffs of the formula

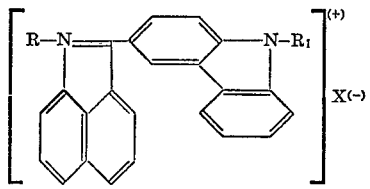

wherein R represents an alkyl, cycloalkyl, aralkyl or aryl radical, $R_1$ represents an alkyl, cycloalkyl or aralkyl radical or R or $R_1$ represents an alkyl radical which is bonded to an adjacent six-membered ring, and X represents an anion, which are prepared by condensation of naphtholactams with carbazole derivates and which are used for dyeing, printing and bulk dyeing of polymers and copolymers of acrylonitrile or of asymmetrical dicyanethylene, of acid-modified aromatic polyesters and of acid-modified polyamides.

The present invention relates to cationic dyestuffs. It is an object of the invention to provide novel basic dyestuffs of the general formula

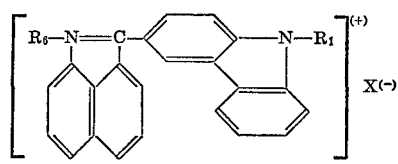

wherein $R_1$ represents an alkyl or aralkyl radical or an alkyl radical which is bonded to an adjacent six-membered ring,
$R_6$ represents an alkyl radical with 2 to 6 C atoms or an aralkyl, cycloalkyl or aryl radical or an alkyl radical which is bonded to the naphthalene ring, and
X represents an anion, and wherein the rings and the acyclic radicals are unsubstituted or contain non-ionic substituents.

A dyestuff of the general formula

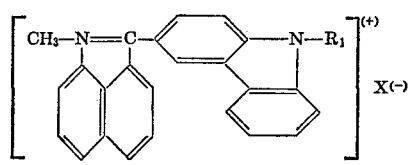

wherein $R_1$ represents an alkyl or aralkyl radical or an alkyl radical which is bonded to an adjacent six-membered ring, and
X represents an anion, and wherein the naphthalene ring and the benzo rings of the carbazole component and $R_1$ contain one or more non-ionic substituents.

A dyestuff of the general formula

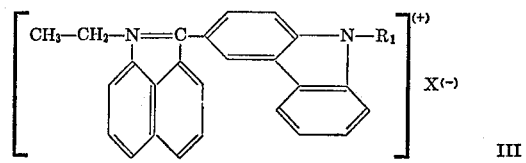

wherein $R_1$ represents an alkyl or aralkyl radical or an alkyl radical which is bonded to an adjacent six-membered ring, and
X represents an anion, and wherein
$R_1$ and the benzo rings of the carbazole system, and the naphthalene rings are unsubstituted or contain non-ionic substituents.

A dyestuff of the general formula

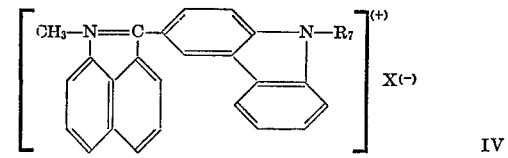

wherein $R_7$ represents an alkyl radical with 3-6 C atoms or an aralkyl radical, and
X represents an anion, and more particularly a dyestuff of the formula

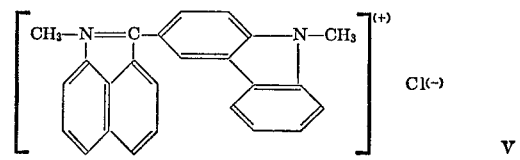

A further object of the invention are a process for the manufacture of cationic dyestuffs of the general formula

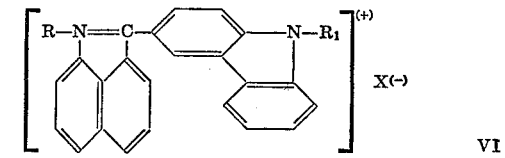

wherein

R represents an alkyl, cycloalkyl, aralkyl or aryl radical,
$R_1$ represents an alkyl, cycloalkyl or aralkyl radical or R and $R_1$ represents an alkyl radical which is bonded to the adjacent six-membered ring,
X represents an anion, and wherein the rings and the acyclic radicals are unsubstituted or contain non-ionic substituents, by condensation of a compound of general formula

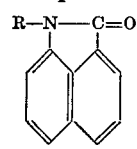

wherein

R has the indicated meaning with a carbazole derivative of general formula

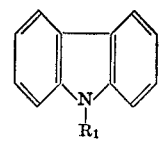

wherein

R₁ has the indicated meaning with the proviso that at least one p-position relative to the nitrogen must be unsubstituted, using an inorganic acid halide as the condensation agent, characterised in that the condensation is carried out with the addition of phosphorus pentoxide, as well as their use for the dyeing, printing and bulk dyeing (spin dyeing) of polymers and copolymers of acrylonitrile or of asymmetrical dicyanethylene, of acid-modified aromatic polyesters and of acid-modified polyamides.

Suitable non-ionic substituents are, for example, alkyl, alkoxy, acyloxy, aryloxy, alkylmercapto, arylmercapto, amino, acylamino, alkylamino, arlkylamino, acyl, alkoxycarbonyl, amidocarbonyl and nitrile groups, and also halogen atoms.

Suitable radicals R are especially methyl, ethyl, n-proply, iso-propyl, n-butyl, iso-butyl, iso-amyl, n-hexyl, chloralkyl, such as β-chlorethyl, cyanalkyl such as β-cyanethyl, methoxycarbonylmethyl, ethoxycarbonylmethyl, β-methoxycarbonylethyl, β-ethoxycarbonylethyl, β-dimethylaminoethyl, β-diethylaminoethyl, β-piperidinylethyl, β-morpholinylethyl, β-methoxyethyl, β-ethoxyethyl, β-dimethylamidocarbonylethyl, dimethylamidocarbonylmethyl, cyclohexyl, benzyl, β-phenylethyl, γ-phenylpropyl, phenyl, 4-methoxyphenyl and 4-methylphenyl.

Preferred radicals R₁ are, for example, methyl, ethyl, n-propyl, iso-propyl, n-butyl, iso-butyl, iso-amyl, n-hexyl, β-chlorethyl, β-cyanethyl, methoxycarbonylmethyl, ethoxycarbonylmethyl, β-methoxycarbonylethyl, β-ethoxycarbonylethyl, benzyl and β-phenylethyl.

Suitable radicals R₆ are preferably ethyl, n-propyl, iso-propyl, n-butyl, iso-butyl, iso-amyl, n-hexyl, β-chlorethyl, β-cyanethyl, β-methoxycarbonylethyl, β-ethoxycarbonylethyl, β-dimethylaminoethyl, β-diethylaminoethyl, β-piperidinylethyl, β-morpholinylethyl, β-methoxyethyl, β-ethoxyethyl, β-dimethylamidocarbonylethyl, cyclohexyl, β-phenylethyl, γ-phenylpropyl, phenyl, 4-methoxyphenyl and 4-methylphenyl.

Suitable naphtholactame of Formula VII for carrying out the process according to the invention are, for example, N-methylnaphtholactam-(1,8),
N-ethyl-naphtholactam-(1,8),
N-iso-propylnaphtholactam-(1,8),
N-n-propyl-naphtholactam-(1,8),
N-iso-butylnaphtholactam-(1,8),
N-n-butyl-naphtholactam-1,8),
N-iso-amyl-naphtholactam-(1,8),
N-n-hexyl-naphtholactam-1,8),
N-cyclohexyl-naphtholactam-(1,8),
N-benzyl-naphtholactam-(1,8),
N-β-phenylethyl-naphtholactam-(1,8),
N-γ-phenylpropyl-naphtholactam-(1,8),
N-phenyl-naphtholactam-(1,8), and
N-2-trimethylene-naphtholactam-(1,8).

Further suitable compounds are naphtholactams which are substituted in the radical R and/or in the naphthalene ring, such as N-methoxycarbonylmethyl-naphtholactam-(1,8),
N-β-chlorethyl-naphtholactam-(1,8),
N-β-cyanethyl-naphtholactam-(1,8),
N-β-dimethylaminoethyl-naphtholactam-(1,8),
N-β-diethylaminoethyl-naphtholactam-(1,8),
N-β-piperidinylethyl-naphtholactam-(1,8),
N-β-morpholinylethyl-naphtholactam-(1,8),
N-β-methoxyethyl-naphtholactam-(1,8),
N-β-ethoxyethyl-naphtholactam-(1,8),
N-β-methoxycarbonylethyl-naphtholactam-(1,8) and
N-β-dimethylamidocarbonylethyl-naphtholactam-(1,8).
N-methyl-4-chloronaphtholactam-(1,8),
N-ethyl-4-bromo-naphtholactam-(1,8),
N-ethyl-4-methoxy-naphtholactam-(1,8),
N-n-butyl-4-ethoxy-naphtholactam-(1,8),
N-iso-amyl-4-methyl-naphtholactam-(1,8),
N-ethyl-4-dimethylamino-naphtholactam-(1,8),
N-ethyl-5-chloro-naphtholactam-(1,8),
N-methyl-7-methoxy-naphtholactam-(1,8),
N-ethyl-4-acetoxy-naphtholactam-(1,8),
N-ethyl-4-methylsulphonyl-amino-naphtholactam-(1,8),
N-2-trimethylene-4-chloro-naphtholactam-(1,8),
N-β-cyanethyl-4-bromo-naphtholactam-(1,8),
N-β-methoxyethyl-4-methoxy-naphtholactam-(1,8) and
N-4'-methoxy-phenyl-naphtholactam-(1,8).

Suitable carbazole derivatives of Formula VIII are, for example, N-methyl-carbazole, N-ethyl-carbazole, N-n-propyl-carbazole, N-iso-amyl-carbazole, N-n-hexyl-carbazole, N-benzyl-carbazole and N-β-phenylethyl-carbazole as well as substituted compounds of Formula VIII such as N-methyl-3-chloro-carbazole,
N-ethyl-3-chloro-carbazole,
N-ethyl-3-bromo-carbazole,
N-ethyl-3-methoxy-carbazole,
N-ethyl-3-ethoxy-carbazole,
N-ethyl-3-n-butoxy-carbazole,
N-ethyl-3-methyl-carbazole,
N-3-diethyl-carbazole,
N-ethyl-3-diethylamino-carbazole,
N-β-cyanethyl-carbazole,
N-β-chlorethyl-carbazole,
N-β-methoxycarbonylethyl-carbazole,
N-methoxycarbonylmethyl-carbazole and
N-β-cyanethyl-3-methoxy-carbazole.

To carry out the process according to the invention, a carbazole derivative of Formula VIII is warmed with an acid halide serving as the condensation agent, such as phosphorus oxychloride, phosphorus oxybromide, phosphorus trichloride, phosphorus tribromide and thionyl chloride, preferably phosphorus oxychloride, or with a mixture of such acid halides, and phosphorus pentoxide is added. A naphtholactam derivative of Formula VII is gradually added at a temperature of between 20° C. and 120° C., preferably 60°–90° C., and the mixture is further kept at the reaction temperature until unchanged naphtholactam can no longer be detected (for example by its characteristic fluorescence). It is also possible to add the phosphorus pentoxide to the finished mixture of the components or to add the carbazole derivative as the last reactant. This inverse sequence of carrying out the reaction is of advantage if a higher-melting naphtholactam derivative is used. The use of an inert diluent for carrying out the condensation is possible but is generally not necessary; appropriately, such an excess of the acid chloride is used that the latter at the same time serves as the solvent. The phosphorus pentoxide is added in an amount of 0.2 to 2 mols, relative to 1 mol of naphtholactam derivative. Larger quantities can also be added without the quality of the resulting dyestuff suffering; however, the use of approximately equimolar amounts is preferred.

The process claimed is particularly advantageous if those compounds of Formulae VII or VIII are chosen in which R and R₁ represent a lower alkyl radical; the extremely smooth course of the condensation of, on the one hand, N-methyl-, N-ethyl-, N-n-propyl-, N-iso-propyl- and N-n-butyl-naphtholactam with, on the other hand, either N-methyl-carbazole or N-ethyl-carbazole, should be particularly highlighted.

The anion X is of no significance as regards the tinctorial properties of the dyestuffs VI; its nature is determined by the acid halide used as the condensation agent, from which it is formed. In general—since phosphorus oxychloride is preferably used as the condensation agent—the dyestuffs VI are isolated and used as chlorides.

In contrast to the process described in Example 5 of Russian patent specification No. 116,643, the process according to the invention yields very pure dyestuffs in processes which are technically very easy to carry out, and in practically quantitative yield. The dyestuffs thus manufactured do not have to be recrystallised or otherwise purified. This makes the new process significantly superior to the state of the art, from which it was also not possible to deduce any indication as to the surprising action of the phosphorus pentoxide.

The dyestuffs according to the invention are suitable for dyeing, printing and bulk dyeing (spin dyeing) materials which consist entirely or predominantly of polymerised, unsaturated nitriles, such as polyacrylonitrile, or of acid-modified polyesters or of acid-modified polyamides. They are distinguished by excellent fastness properties, especially by their fastness to light, wet processing, decatising and rubbing.

Suitable materials for dyeing with the cationic dyestuffs of these formulae are especially flocks, fibres, filaments, ribbons, woven fabrics or knitted fabrics of polyacrylonitrile or of copolymers of acrylonitrile with other vinyl compounds, such as vinyl chloride, vinylidene chloride, vinyl fluoride, vinyl acetate, vinylpyridine, vinylimidazole, vinyl alcohol, acrylic and methacrylic acid esters and amides, and asymmetrical dicyanethylene, or flocks, fibres, filaments, ribbons, woven fabrics or knitted fabrics of acid-modified aromatic polyesters. Acid modified aromatic polyesters are, for example, polycondensation products of sulphoterephthalic acid and ethylene glycol, that is to say polyethylene glycol terephthalates containing sulphonic acid groups (of the type of Dacron 64 of E. I. du Pont de Nemours and Company), such as are described in Belgian patent specification 549,179 and in U.S.A. patent specification 2,893,816.

Dyeing can be carried out in a weakly acid liquor, in which case the material is appropriately introduced into the dyebath at 40–60° C. and then dyed at the boil. It is also possible to dye under pressure at temperatures above 100° C. Furthermore, the dyestuffs can be added to spinning solutions for the manufacture of fibres containing polyacrylonitrile, or be applied to the unstretched fibre.

The parts indicated in the examples are parts by weight.

EXAMPLE 1

120 parts of N-ehtylcarbazole and 240 parts of phosphorus oxychloride are stirred with 85 parts of phosphorus pentoxide. 120 parts of liquefied N-ethyl-naphtholactam are run at approx. 60° C., from a heated vessel, over the course of about 2 hours. The mixture is stirred for a further 15–20 hours at 60–70° C. and is then poured into 2,000–8,000 parts of water at about 50° C. After completion of hydrolysis of the phosphorus oxychloride, the mixture is warmed until the dyestuff has dissolved, clarified with 2–3 parts of active charcoal and filtered. On cooling the filtrate, the dyestuff of formula

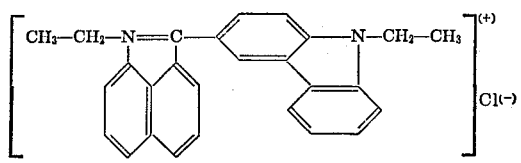

separates out in approximately quantitative yield and in a very pure form. The dyestuff yields very fast, very strong bluish-tinged red dyeings and prints on polyacrylonitrile and acid-modified polyester.

If instead of the N-ethyl-naphtholactam the particular equivalent quantity of N-methyl-, N-iso-propyl-, N-n-propyl-, N-n-butyl-, N-iso-amyl or N-n-hexyl-naphtholactam-(1,8) is used, and in other respects the procedure is kept unchanged, then tinctorially similar dyestuffs are obtained in an immediately pure form and again in almost quantitative yields.

EXAMPLE 2

181 parts of N-methyl-carbazole and 209 parts of 1,2-trimethylene-naphtholactam-(1,8) are stirred for 10–20 hours, at 70–80° C., with 350 parts of phosphorus oxychloride and 140 parts of phosphorus pentoxide. Working-up is carried out as in Example 1. The dyestuff of formula

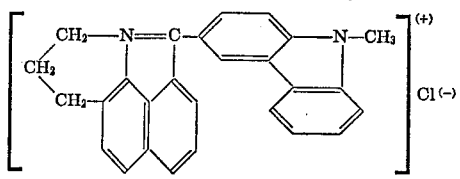

is obtained in almost quantitative yield; it gives red dyeings and prints of outstanding fastness on polyacrylonitrile and acid-modified polyesters.

If instead of the N-methyl-carbazole the particular equivalent quantity of N-ethyl-, N-β-chlorethyl- or N-β-cyan-ethyl-carbazole is used, and in other respects the procedure is kept unchanged, then tinctorially similar dyestuffs are obtained in an immediately pure form and again in almost quantitative yields.

EXAMPLE 3

22 parts of N-β-cyanethyl-carbazole and 50–60 parts of phosphorus oxychloride are stirred with 15–20 parts of phosphorus pentoxide. 18.3 parts of N-methyl-naphtholactam-(1,8) are added in portions at 60–70° C. and the mixture is thereafter stirred for a further 10 hours at about 75° C. The mixture is cooled and poured into 500–1,000 parts of water. The dyestuff of formula

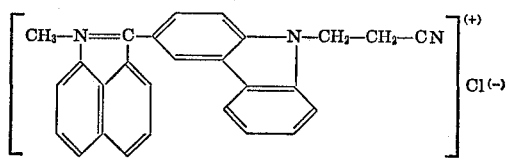

separates out and is filtered off after completion of hydrolysis of the excess condensation agent. It is suitable for dyeing and printing polyacrylonitrile and acid-modified polyesters in very fast, bluish-tinged red shades.

If instead of the N-β-cyanethyl-carbazole the particular equivalents quantity of N-methoxycarbonylmethylcarbazole, N-ethoxycarbonylmethylcarbazole, N-β-methoxycarbonylethylcarbazole, N-β-ethoxycarbonylethylcarbazole or N-β-chloroethylcarbazole is used, and in other respects the procedure is kept unchanged, very fast, red dyestuffs are again obtained.

EXAMPLE 4

257 parts of N-benzyl-carbazole and 450–500 parts of phosphorus oxychloride and 150 parts of phosphorus pentoxide are warmed to about 70° C. 225 parts of N-n-butyl-naphtholactam-(1,8) are added at this temperature, and the mixture is stirred for 15–20 hours at about 70° C. and thereafter allowed to run into 10,000 parts of water at 50–60° C. The separating-out of the dyestuff of formula

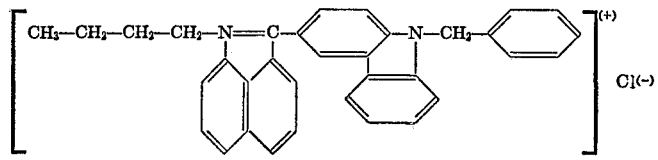

is completed by adding sodium chloride. The dyestuff yields red, very fast dyeings and prints on the materials mentioned.

If instead of the N-benzylcarbazole the particular equivalent quantity of N-ethyl-3-chlorocarbazole or N-ethyl-3-bromocarbazole is used, and in other respects the procedure is kept unchanged, very fast, red dyestuffs are again obtained.

EXAMPLE 5

225 parts of phosphorus oxychloride, 85 parts of 4-brom-N-ethyl-naphtholactam-(1,8), 50–60 parts of phosphorus pentoxide and 60 parts of N-ethyl-carbazole are stirred for 10–20 hours at 80–90° C. Working-up is carried out in accordance with the data of Example 1. The dyestuff of formula

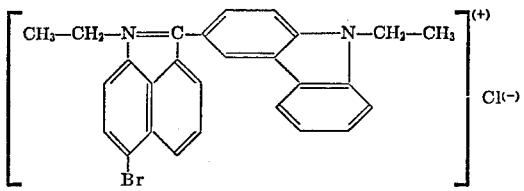

is obtained which yields very fast, violet dyeings and prints on the materials mentioned.

If instead of the 4 - brom-N-ethyl-naphtholactam the particular equivalent quantity of N-ethyl-2-bromo-, -2-chloro-, -2-ethyl-, -4-methyl-, -4-methoxy-, -4-ethoxy-, -4-acetylamino-, -4-dimethylamino-, -6-methoxy-, -7-methoxy- or -2-bromo-4-methoxynaphtholactam-(1,8) is used, and in other respects the procedure is kept unchanged, very fast, tinctorially valuable dystuffs are again obtained.

EXAMPLE 6

An aqueous dyebath containing 0.75 g. of 30% strength acetic acid, 0.40 g. of sodium acetate and 0.20 g. of the dyestuff of formula

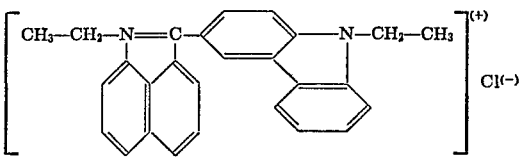

per liter is charged, at approx. 45° C., with the amount of polyacrylonitrile fibres corresponding to a liquor ratio of 1:40, heated to the boil over the course of 20–30 minutes and kept at this temperature for 30–60 minutes. After rinsing and drying the fibres, a very fast, very strong bluish-tinged red dyeing is obtained.

EXAMPLE 7

A polyacrylonitrile fabric is treated with a printing paste of the following composition: 30 parts of the dyestuff of the formula of Example 1, 50 parts of thiodiethylene glycol, 30 parts of cyclohexanol, 30 parts of 30% strength acetic acid, 500 parts of crystal gum, 30 parts of aqueous zinc nitrate solution (d.=1.5) and 330 parts of water.

The resulting print is dried, steamed for 30 minutes and subsequently rinsed. A very strong bluish-tinged red print having very good fastness properties is obtained.

EXAMPLE 8

Acid-modified polyglycol terephthalate fibres of the type of Dacron 64 (Du Pont), or as described in Belgian patent specification 549,179 and in U.S.A. patent specification 2,893,816, are introduced at 20° C., using a liquor ratio of 1:40, into an aqueous bath which, per litre, contains 3 g. of sodium sulphate, 0.5–2 g. of an oleyl polyglycol ether (50 mols of ethylene oxide), 2.5–5 g. of diphenyl and 0.3 g. of the dyestuff of the formula of Example 1, and which has been adjusted to a pH value of 4.5–5.5 with acetic acid. Thereafter the bath is heated to 98° over the course of 30 minutes and kept at this temperature for 60 minutes. The fibres are subsequently rinsed and dried. A bluish-tinged red dyeing having very good fastness properties is obtained.

EXAMPLE 9

Acid-modified polyglycol terephthalate fibres, as in Example 8, are introduced at 20° C., using a liquor ratio of 1:40, into an aqueous bath which, per litre, contains 6–10 g. of sodium sulphate, 0.5–1 g. of oleyl polyglycol ether (50 mols of ethylene oxide), 0–15 g. of dimethyl-benzyl-dodecyl-ammonium chloride and 0.3 g. of the dyestuff of the formula of Example 1, and which has been adjusted to pH 4–5 with acetic acid. The bath is heated to 120° C. over the course of 30 minutes and kept at this temperature for 60 minutes. Thereafter the fibres are rinsed and dried. A bluish-tinged red dyeing having very good fastness properties is obtained.

Following the procedures of Examples 6–9, all the other dyestuffs mentioned in the preceding examples can also be used to dye polyacrylonitrile fibres and acid-modified aromatic polyester fibres, whereupon colour shades are achieved which are identical or similar to those on polyacrylonitrile.

What is claimed is:
1. A dyestuff of the formula

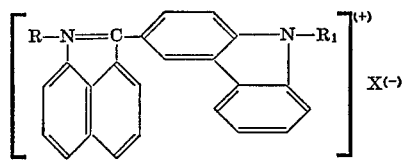

wherein $R_1$ is alkyl of 1–6 carbon atoms, chloroethyl, cyanoethyl, methoxycarbonylmethyl, methoxycarbonylethyl, ethoxycarbonylmethyl, ethoxycarbonylethyl, benzyl, or phenylethyl; and R is alkyl of 2–6 carbon atoms, chloroalkyl of 2–6 carbon atoms, cyanoalkyl of 2–6 carbon atoms, cyclohexyl, benzyl, phenyl, phenylethyl, phenylpropyl, methoxyphenyl, methylphenyl, or methyl or ethyl substituted by methoxycarbonyl, ethoxycarbonyl, dimethylamino, diethylamino, piperidinyl, morpholinyl, methoxy, ethoxy, dimethylamidocarbonyl, or diethylamidocarbonyl;

R is also trimethylene forming a ring with N and the 2-position of the naphtholactam ring to which N is attached; and structures having the above formula wherein any of the carbocyclic rings is substituted by chloro, bromo, methoxy, ethoxy, butoxy, methyl, dimethylamino, acetoxy, methylsulfonylamino, or methoxyphenyl; and X is an anion.

2. A dyestuff of claim 1 wherein $R_1$ is an alkyl of 1–6 carbon atoms, benzyl, or cyanoethyl; and R is an alkyl of 2–6 carbon atoms or trimethylene forming a ring with the nitrogen and the 2-position of the ring to which the nitrogen is attached.

3. A dyestuff of the formula:

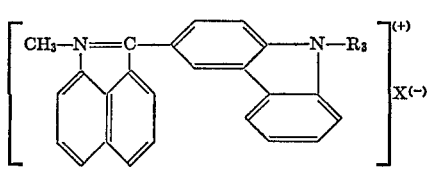

wherein $R_3$ is alkyl of 3–6 carbon atoms, benzyl, or phenylethyl; and

X is an anion.

4. A dyestuff of the formula

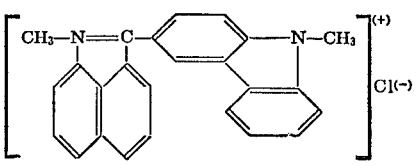

5. A dyestuff of the formula

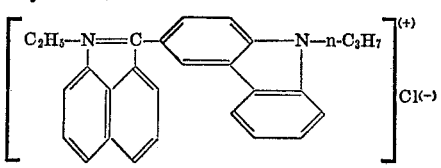

6. A dyestuff of the formula

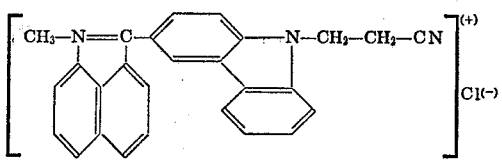

7. A dyestuff of the formula

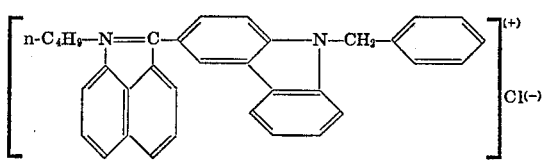

8. A dyestuff of the formula

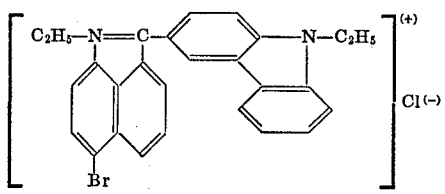

9. A dyestuff of the formula

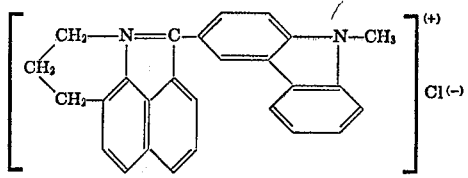

10. Process for the manufacture of the dyestuff of claim 1 by condensation of a naphtholactam compound of the formula

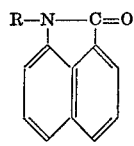

with a carbazole derivative of the formula:

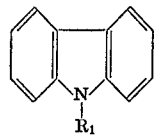

wherein at least one p-position relative to the carbazole nitrogen is unsubstituted, said condensation being carried out in the presence of an inorganic acid halide as the condensation agent and also in the presence of phosphorus pentoxide.

11. The process of claim 10 wherein said inorganic acid halide is phosphorus oxychloride.

12. The process of claim 10 wherein R and $R_1$ are each alkyl of 1–6 carbon atoms.

13. The process of claim 10 wherein the phosphorus pentoxide is present in approximately equimolar amounts with respect to said naphtholactam compound.

14. Process of claim 10 in which the reaction is carried out in the presence of excess phosphorus oxychloride as the diluent.

15. Process of claim 10, in which the reaction is carried out at temperatures between 20° C. and 120° C.

16. Process of claim 17, in which the reaction is carried out at temperature between 60° C. and 90° C.

References Cited

Noland et al., J. Org. Chem. 26, 4254–62 (1961).

HENRY R. JILES, Primary Examiner

G. T. TODD, Assistant Examiner

U.S. Cl. X.R.

260—37 N, 40 R, 41 C, 326.5 B